United States Patent
Watanabe et al.

(10) Patent No.: US 7,400,969 B2
(45) Date of Patent: Jul. 15, 2008

(54) NAVIGATION SYSTEM

(75) Inventors: Takayuki Watanabe, Iwaki (JP);
 Koutaro Wakamatsu, Iwaki (JP);
 Daishi Mori, Yokohama (JP); Masana Minami, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 507 days.

(21) Appl. No.: 11/249,043

(22) Filed: Oct. 11, 2005

(65) Prior Publication Data

US 2007/0239347 A1    Oct. 11, 2007

(30) Foreign Application Priority Data

Oct. 14, 2004 (JP) ............................. 2004-299490
 Apr. 28, 2005 (JP) ............................. 2005-130834

(51) Int. Cl.
 *G21C 21/00* (2006.01)
(52) U.S. Cl. .................. 701/200; 701/213; 342/357.06
(58) Field of Classification Search ................ 701/200, 701/213–216, 26; 342/357.06, 357.08, 357.12
 See application file for complete search history.

(56) References Cited

U.S. PATENT DOCUMENTS

| | | | | |
|---|---|---|---|---|
| 5,902,349 | A | * | 5/1999 | Endo et al. ................... 701/202 |
| 6,597,985 | B2 | | 7/2003 | Toyooka |
| 6,931,322 | B2 | * | 8/2005 | Jung et al. ................... 701/216 |
| 7,116,268 | B2 | * | 10/2006 | Akano ................... 342/357.02 |
| 7,152,015 | B2 | * | 12/2006 | Manzen ...................... 702/150 |
| 7,242,791 | B2 | * | 7/2007 | Han et al. ................... 382/104 |

* cited by examiner

*Primary Examiner*—Yonel Beaulieu
(74) *Attorney, Agent, or Firm*—Brinks Hofer Gilson & Lione

(57) ABSTRACT

A navigation system includes a GPS receiver for receiving radio waves transmitted from multiple GPS satellites and producing a measured position, an error-range setting unit for setting an estimated error range in which a measured position at the time of current positioning by the GPS receiver is included, a relative-position determining unit, and a position correcting unit. The relative-position determining unit and the position correcting unit correct the measured position by using an actual measured position, when the actual measured position produced by the GPS receiver at the current positioning time is in the estimated error range. The relative-position determining unit and the position correcting unit correct the measured position in accordance with a relative positional relationship between the actual measured position and the estimated error range, when the actual measured position is out of the estimated error range.

20 Claims, 7 Drawing Sheets

NAVIGATION SYSTEM

BACKGROUND OF THE INVENTION

1. Field of the Invention

The present invention relates to a navigation system that corrects a measured position obtained by using a GPS receiver, and that uses the corrected measured position.

2. Description of the Related Art

It has been conventionally known that a measured position obtained by using a GPS receiver varies due to error factors, such as multipaths, and a navigation system that corrects the measured position so as to reduce an influence caused by the error is known (refer to, e.g., Japanese Unexamined Patent Application Publication No. 8-313278, pages 5 to 8 and FIGS. 1 to 3). The navigation system estimates the current measured position based on the previous measured position to set an estimated error range. When the current measured position is in the estimated error range, the navigation system uses the actual measured position, and when the current measured position is out of the estimated error range, the navigation system uses the estimated measured position. Thus, when error in the measured position using GPS is large, the navigation system can reduce the influence.

In the identified Publication, when the current measured position is out of the estimated error range, the estimated measured position is used. Since the estimated error range is set centering at the estimated measured position, the estimated measured position is inevitably set at the center of the estimated error range. Thus, for example, even when the estimated measured position is slightly out of the estimated error range, the estimated measured position is used without considering the slight difference. Thus, there is a problem in that error is increased. The Publication also discloses a method for correcting the measured position by adding the estimated measured position and the actual measured position through predetermined weighting. In this method, even when the measured position is expected to be in the estimated error range, the corrected measured position may be out of the estimated error range (in particular, when the actual measured position is greatly out of the estimated error range). Thus, there is a problem in that error can be increased. For example, since it is considered that the accuracies of a velocity and a travel direction detected with a GPS receiver are high, the possibility that an error-free measured position is in the estimated error range is considerably increased when the current measured position is assumed to be correct.

SUMMARY OF THE INVENTION

The present invention is made in view of the above-described situations, and an object of the present invention is to provide a navigation system that can improve the correction accuracy of positioning error.

To overcome the above described problems, the present invention provides a navigation system that includes a GPS receiver, an error-range setting section, and a position correction section. The GPS receiver receives radio waves transmitted from multiple GPS satellites and produces a measured position. The error-range setting section sets an estimated error range in which a measured position at the time of current positioning by the GPS receiver is included. The position correcting section corrects the measured position by using an actual measured position, when the actual measured position produced by the GPS receiver at the current positioning time is in the estimated error range. The position correcting section corrects the measured position in accordance with a relative positional relationship between the actual measured position and the estimated error range, when the actual measured position is out of the estimated error range. With this arrangement, even when the actual measured position is out of the estimated error range, the correction accuracy of the measured position can be improved, since measured-position correction considering the positional relationship relative to the estimated error range is performed.

Preferably, the position correcting section corrects the measured position so that the corrected measured position is in the estimated error range. With this arrangement, even when the actual measured position is out of the estimated error range, the measured position is corrected so that a corrected measured position lies in the estimated error range while the positional relationship relative to the estimated error range is considered. Thus, compared to a case in which the measured position is unconditionally corrected to the center position of the estimated error range, the correction accuracy of positioning error can be increased.

Preferably, the position correcting section corrects the measured position so that the corrected measured position is located in the estimated error range and is shifted toward the actual measured position. With this arrangement, it is possible to ensure that the actual measured position is reflected in the corrected measured position, thereby preventing an increase in error.

Preferably, the position correcting section corrects the measured position so that the corrected measured position is located on an outer edge of the estimated error range. With this arrangement, even when the actual measured position is out of the estimated error range, the measured position is corrected so that the corrected measured position overlaps the outer edge of the estimated error range while the positional relationship relative to the estimated error range is considered. Thus, compared to the case in which the measured position is unconditionally corrected to the center position of the estimated error range, the correction accuracy of positioning error can be increased.

Preferably, the position correcting section corrects the measured position so that the corrected measured position is located on an outer edge of the estimated error range and is shifted toward the actual measured position. With this arrangement, it is possible to ensure that the actual measured position is reflected in the corrected measured position, thereby preventing an increase in error.

Preferably, the GPS receiver provides, together with the measured position, a velocity and a travel angle at which the measured position moves, and the error-range-setting section sets the estimated error range in accordance with the velocity and the travel angle. In general, since the accuracies of the velocity and the travel angle supplied from the GPS receiver 2 are higher than the accuracy of the measured position, setting the estimated error range using the velocity and the travel angle makes it possible to accurately set the estimated error range that is likely to include the current measured position.

Preferably, for the estimated error range, a circumferential width centering at a previous measured position is set with respect to a previous travel angle supplied from the GPS receiver, considering a travel-angle variable range set based on a previous velocity. In general, when the velocity is high, a variation in the travel angle at the current positioning time is small, and when the velocity is low, a variation in the velocity is large. Thus, by considering a travel-angle variable range set based on the velocity, it is possible to accurately set the circumferential width of the estimated error range.

Preferably, for the estimated error range, a radial width centering at a previous measured position is set with respect to a previous velocity supplied from the GPS receiver, considering a velocity variable range set based on a previous velocity. In general, when the velocity is high, a variation in the velocity at the current positioning time is small, and when the velocity is low, a variation in the velocity is large. Thus, by considering a velocity variable range set based on the velocity, it is possible to accurately set the radial width of the estimated error range.

Preferably, the travel-angle variable range is set based on a result obtained by determining, using an actual vehicle, a relationship between velocities supplied from the GPS receiver and a travel-angle fluctuation range. Preferably, the velocity variable range is set based on a result obtained by determining, using an actual vehicle, a relationship between velocities supplied from the GPS receiver and a velocity fluctuation range. Thus, since the accurate travel-angle or velocity variable range can be used, the accuracy of the estimated error range can be increased and the correction accuracy of the measured position can further be increased.

Preferably, the size of the estimated error range is set to be variable in accordance with a positioning environment. With this arrangement, since an estimated error range corresponding to a positioning environment can be set, appropriate correction corresponding to the positioning environment can be performed.

Preferably, the estimated error range is set to be large when the positioning environment is favorable. With this arrangement, when the positioning environment is favorable and the accuracy of the position measured by the GPS is high, the number of opportunities using the GPS-measured position without correction is increased to allow a reduction in cumulative error.

Preferably, the navigation system further includes an estimated-error-range correcting section for correcting the orientation of the estimated error range set by the error-range-setting section, in accordance with the previous value of the travel angle at which the measured position moves and multiple values before the previous value. With this arrangement, when the vehicle travels at a place where the vehicle travel direction changes greatly as in the case of a winding road, the measured position can be corrected by considering a change in the travel direction. Thus, it is possible to further improve the correction accuracy of the measured position.

Preferably, the estimated-error-range correcting section corrects the orientation of the estimated error range in accordance with the previous value of the travel angle at which the measured position moves and the value before the previous value. Since the estimated error range is corrected in accordance with the value of the previous travel angle and the value of the travel angle before the previous one, the correction can be performed with less computation and the processing load can be reduced.

Preferably, in accordance with the previous value of the travel angle at which the measured position moves and the value before the previous value, the estimated-error-range correcting section calculates a direction in which the measured position moves from the previous positioning time to the current positioning time, and corrects the orientation of the estimated error range so that the calculated direction becomes the center of the estimated error range. This arrangement can estimate the vehicle travel direction when the measured position is to be corrected and can adjust the arrangement of the estimated error range according to the estimated travel direction, thereby making it possible to perform measured-position correction that is more suitable in an actual situation.

Preferably, the estimated-error-range correcting section corrects the orientation of the estimated error range, considering an amount of change in the travel angle. With this arrangement, when a change in the travel angle is large, the amount of adjustment of the arrangement of the estimated error range can be set large, and when a change in the travel angle is small, the amount of adjustment of the arrangement of the estimated error range can be set small. Thus, is possible to perform measured-position correction according to a road shape.

Preferably, the estimated-error-range correcting section corrects the orientation of the estimated error range, when a change in the travel angle at which the measured position moves is larger than a reference value. This arrangement can reduce the processing load when the change in the travel angle is small.

DESCRIPTION OF THE PREFERRED EMBODIMENTS

A navigation system according to one example of the present invention will be described below with reference to the accompanying drawings.

First Embodiment

Figure 1:
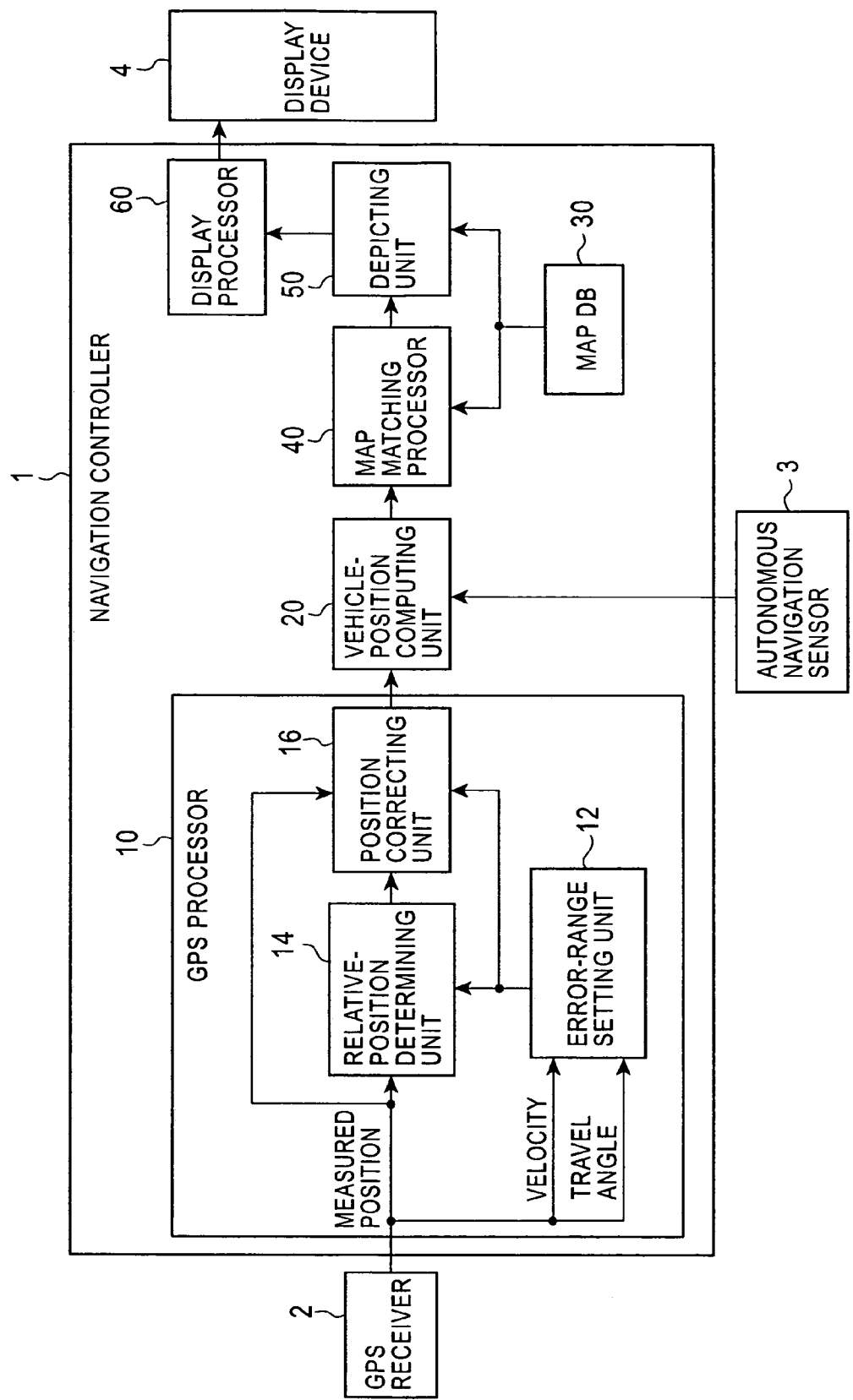
FIG. 1 is a diagram showing the configuration of a navigation system according to a first embodiment.

FIG. 1 is a diagram showing the configuration of a navigation system according to a first embodiment. The navigation system shown in FIG. 1 includes a navigation controller 1, a GPS receiver 2, an autonomous navigation sensor 3, and a display device 4.

The navigation controller 1 controls the entire navigation system. By using, for example, a CPU, ROM, and RAM, the navigation controller 1 executes a predetermined operation program to achieve its function.

The GPS receiver 2 receives radio waves transmitted from multiple GPS satellites, performs two-dimensional or three-dimensional positioning, and produces the absolute position (the measured position), the velocity, and the direction (the travel angle) of a vehicle. The autonomous navigation sensor 3 includes an angle sensor, such as a gyroscope, for detecting a vehicle rotation angle as a relative angle and a distance sensor for generating a pulse at each predetermined distance, and produces the relative position and direction of the vehicle. In accordance with graphics data received from the navigation controller 1, the display device 4 displays various images, such as map images of the vicinity of the vehicle.

As shown in FIG. 1, the navigation controller 1 includes a GPS processor 10, a vehicle-position computing unit 20, a map database (DB) 30, a map matching processor 40, a depicting unit 50, and a display processor 60. In accordance with the measured position, velocity, and travel angle received from the GPS receiver 2, the GPS processor 10 corrects the measured position. The GPS processor 10 includes an error-range setting unit 12, a relative-position determining unit 14, and a position correcting unit 16. In accordance with the velocity and travel angle supplied from the GPS receiver 2 at a certain positioning time, the error-range setting unit 12 sets an estimated error range in which the measured position can exist at the current positioning time. The relative-position determining unit 14 determines a relative-position relationship between the estimated error range set by the error-range setting unit 12 and the measured position received from the GPS receiver 2 at the current positioning time. Based on the estimated error range set by the error-range setting unit 12 and the relative-position relationship determined by the relative-position determining unit 14, the position correcting unit 16 corrects the measured position, when correction is required. When correction is not required (i.e., when the measured position received from the GPS receiver 2 is included in the estimated error range (described below)), the position correcting unit 16 provides the measured position, received from the GPS receiver 2, without correction. The operation of the relative-position determining unit 14, which determines the relative-position relationship between the estimated error range and the measured position provided using the GPS receiver 2, may be performed by the position correcting unit 16. The measured position provided from the position correcting unit 16 is supplied to the vehicle-position computing unit 20.

The vehicle-position computing unit 20 computes the vehicle position in accordance with the measured position received from the position correcting unit 16 of the GPS processor 10 and a vehicle position obtained by the relative position and direction received from the autonomous navigation sensor 3. For example, a predetermined error circle centering on a measured position is assumed. When the vehicle position computed based on the output of the autonomous navigation sensor 3 is within the error circle, a vehicle position obtained based on the output of the autonomous navigation sensor 3 is employed as the vehicle position. On the other hand, when the vehicle position computed based on the output of the autonomous navigation sensor 3 is not within the error circle, a measured position produced by the GPS processor 10 is employed as the vehicle position.

The map database 30 stores, as map data, detailed data of links and nodes for representing roads, image data required for displaying maps, and data required for performing various navigation operations such as route search and route guidance. By comparing the vehicle position received from the vehicle-position computing unit 20 with a travel path and a road shape on a map, the map matching processor 40 performs map matching to correct the vehicle position. Through the map matching, the position in the width direction of a road is corrected with high accuracy. Based on the corrected vehicle position supplied from the map matching processor 40, the depicting unit 50 performs processing for depicting a map image of the vicinity of the vehicle position. The resulting graphics data is sent to the display processor 60 and is converted into signals in a format suitable for display, so that a map image of the vicinity of the vehicle is displayed on the display device 4.

The error-range setting unit 12 described above corresponds to an error-range setting section, and the relative-position determining unit 14 and the position correcting unit 16 correspond to a position correcting section.

The navigation system of the present embodiment has the configuration described above, and the measured-position correction operation performed by the GPS processor 10 will be described next.

Figure 2:
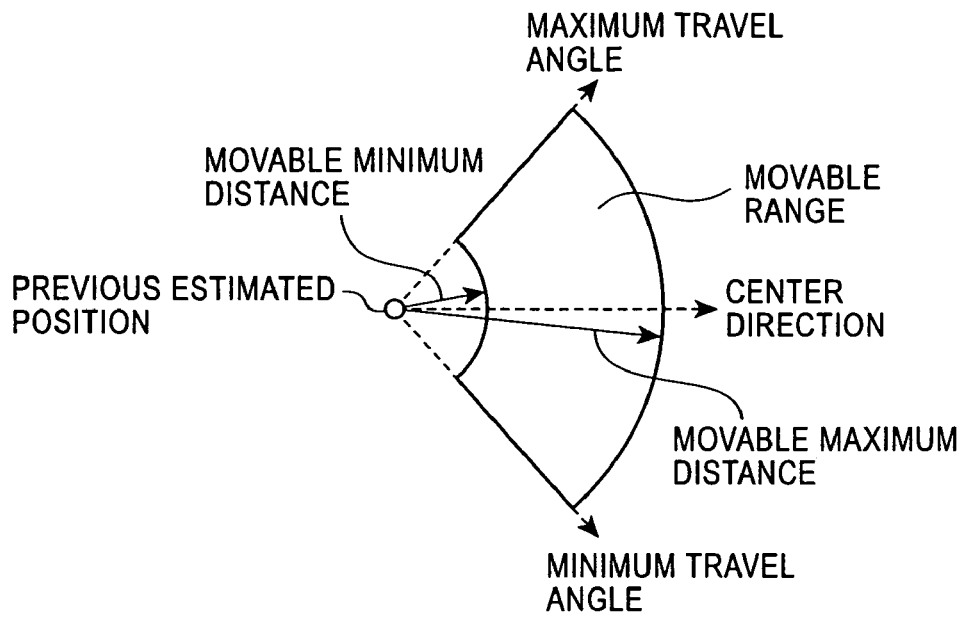
FIG. 2 is a schematic diagram illustrating an example of an estimated error range set in the first embodiment.
Figure 3:
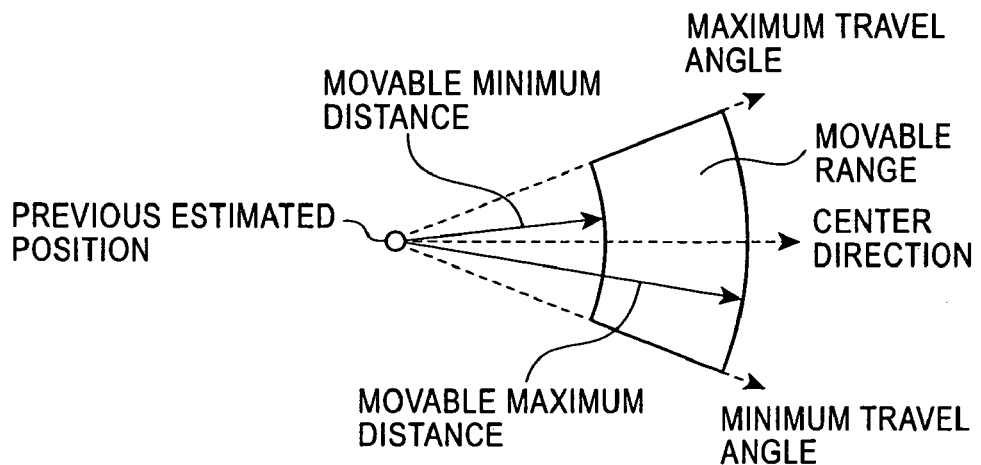
FIG. 3 is a schematic diagram illustrating another example of the estimated error range set in the first embodiment.

FIGS. 2 and 3 are schematic diagrams illustrating an estimated error range set in the present embodiment. FIG. 2 shows an estimated error range when the vehicle velocity is low and FIG. 3 shows an estimated error range when the vehicle velocity is high. As shown in these figures, the estimated error range has the shape of a sector that is obtained by cutting off an area, surrounded by a concentric circle, with two straight lines passing through the circle center. The small-radius portion of the concentric circle represents a movable minimum distance at the current positioning time relative to the previous measured position, and the large-radius portion of the concentric circle represents a movable maximum distance at the current positioning time relative to the previous measured position. One of two straight lines passing through the circle center represents a minimum travel angle relative to the previous measured position (i.e., the upstream one in the counter-clockwise direction in FIGS. 2 and 3) and the other straight line represents a maximum travel angle relative to the previous measured position.

The features of the above-noted estimated error range are summarized as follows.

1) When the velocity is reduced, the difference between the minimum travel angle and the maximum travel angle increases (FIG. 2), and when the velocity is increased, the difference between the minimum travel angle and the maximum travel angle decreases (FIG. 3).

2) For the estimated error range, a circumferential width centering at the previous measured position (i.e., the angular difference between the minimum travel angle and the maximum travel angle) is set with respect to the previous travel angle supplied from the GPS receiver 2, considering a travel-angle variable range set based on the previous velocity. The travel-angle variable range is set using a result obtained by determining, using an actual vehicle, the relationship between velocities supplied from the GPS receiver 2 and a travel-angle fluctuation range.

3) For the estimated error range, a radial width centering at the previous measured position (i.e., the distance between the small radius and the large radius of the concentric circle) is set with respect to the previous velocity supplied from the GPS receiver 2, considering a velocity variable range set based on the previous velocity. The velocity variable range is set using a result obtained by determining, using an actual vehicle, the relationship between velocities supplied from the GPS receiver 2 and a velocity fluctuation range.

4) The size of the estimated error range is set to be variable in accordance with a positioning environment. For example, when the positioning environment is favorable, the estimated error range is set to be large.

A specific method for setting the estimated error range will be described next. Radial values (the values of the small radius and the large radius) of the estimated error range are determined using the previous velocity supplied from the GPS receiver 2. The small radius R1 and the large radius R2 are calculated in accordance with the following equations. The units are in meters.

$$R1 = ((\text{Previous Velocity}) + (\text{Estimated Acceleration Minimum})) \times 1000/3600 \quad (1)$$

$$R2 = ((\text{Previous Velocity}) + (\text{Estimated Acceleration Maximum})) \times 1000/3600 \quad (2)$$

where ((Previous Velocity)+(Estimated Acceleration Minimum)) and ((Previous Velocity)+(Estimated Acceleration Maximum)) indicate a velocity fluctuation range, and the estimated acceleration minimum and the maximum acceleration maximum are set based on the result of measurement using an actual vehicle. Further, the 1000/3600 is used to convert the units to meters.

Figure 4:
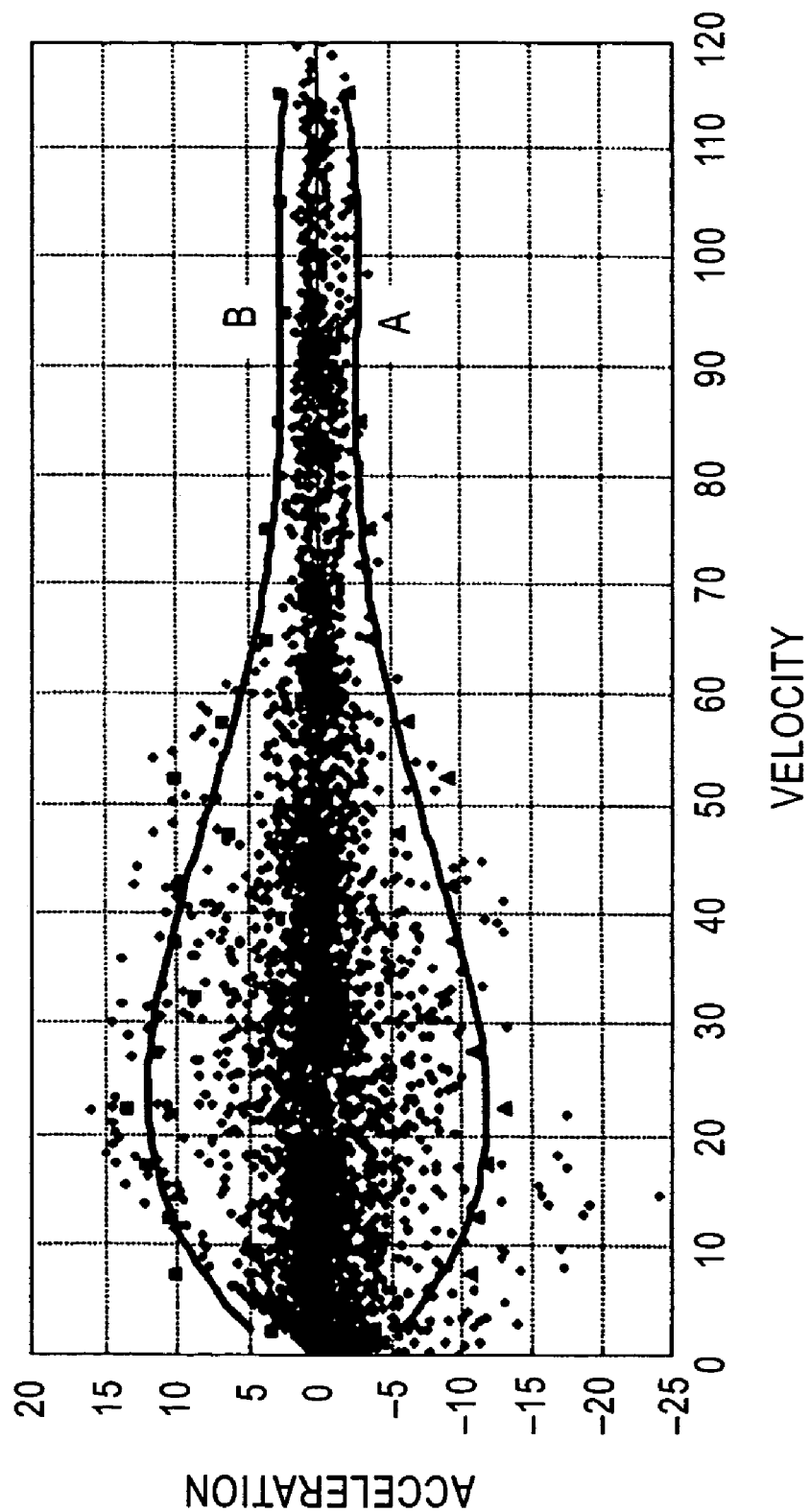
FIG. 4 is a plot showing the experimental result of an estimated acceleration.

FIG. 4 is a plot showing the experimental result of the estimated acceleration. In FIG. 4, the horizontal axis indicates velocity (per hour) and the vertical axis indicates acceleration. When the velocity is supplied from the GPS receiver 2, for example, every second, the acceleration is calculated by subtracting the previous velocity from the current velocity. The actual measurement values of the acceleration vary as shown in FIG. 4. An approximated curve A indicating the minimum of the measurement values is determined and is used as the estimated acceleration minimum for each velocity. Similarly, an approximated curve B indicating the maximum of the measurement values is determined and is used as the estimated acceleration maximum for each velocity.

The circumferential angles (the minimum travel angle and the maximum travel angle) in the estimated error range are determined using the previous travel angle supplied from the GPS receiver 2. A minimum travel angle $\theta1$ and a maximum travel angle $\theta2$ are calculated based on the following equations.

$$\theta1 = (\text{Previous Travel Angle}) + (\text{Estimated Angular-velocity Minimum}) \quad (3)$$

$$\theta2 = (\text{Previous Travel Angle}) + (\text{Estimated Angular-velocity Maximum}) \quad (4)$$

where ((Previous Travel Angle)+(Estimated Angular-velocity Minimum)) and ((Previous Travel Angle)+(Estimated Angular-velocity Maximum)) indicate a travel-angle fluctuation range, and the estimated angular-velocity minimum and the estimated angular-velocity maximum are set based on the result of measurement using an actual vehicle.

Figure 5:
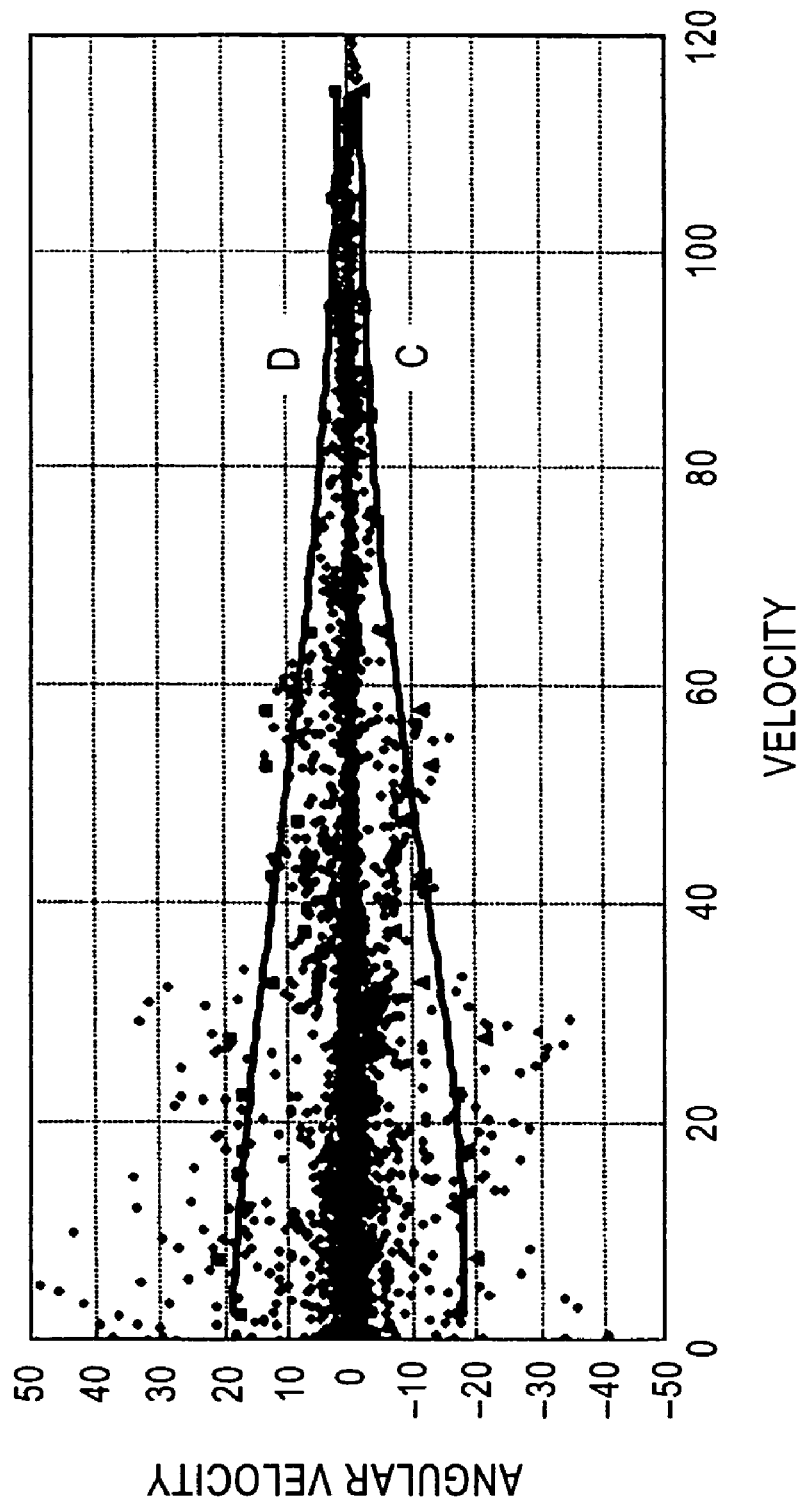
FIG. 5 is a plot showing the experimental result of the estimated angular velocity.

FIG. 5 is a plot showing the experimental result of the estimated angular velocity. In FIG. 5, the horizontal axis indicates velocity (per hour) and the vertical axis indicates angular velocity. When the travel angle is supplied from the GPS receiver 2, for example, every second, the angular velocity is calculated by subtracting the previous angular velocity from the current angular velocity. The actual measurement values of the angular velocity vary as shown in FIG. 5. An approximated curve C indicating the minimum of the measurement values is determined and is used as the estimated angular-velocity minimum for each velocity. Similarly, an approximated curve D indicating the maximum of the measurement values is determined and is used as the estimated angular-velocity maximum for each velocity.

Figure 6A:
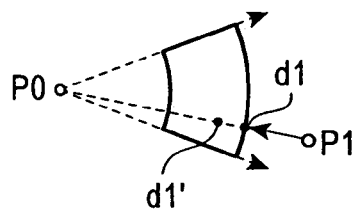
FIGS. 6A to 6H are diagrams showing specific examples of measured-position correction processing performed by a position correcting unit.

FIGS. 6A to 6H are diagrams showing specific examples of measured-position correction processing performed by the position correcting unit 16. FIG. 6A shows a case in which the distance from a previous measured position P0 to a current measured position P1 is greater than the movable maximum distance of the estimated error range and the current travel angle lies between the minimum travel angle and the maximum travel angle. The positional relationship is determined by the relative-position determining unit 14. In this case, the position correcting unit 16 performs measured-position correction for moving the current measured position P1 to a large-radius portion d1, which corresponds to the movable maximum distance, toward the previous measured position P0. In this case, rather than correcting the measured position P1 to the position d1 so as to lie at the large-radius portion (on the outer edge of the estimated error range) corresponding to the movable maximum distance, the position correcting unit 16 may correct the measured position P1 to a measured position d1' so as to lie inside the outer edge.

Figure 6B:
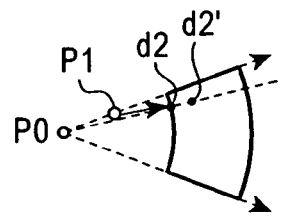

FIG. 6B shows a case in which the distance from the previous measured position P0 to the current measured position P1 is smaller than the movable minimum distance of the estimated error range and the current travel angle lies between the minimum travel angle and the maximum travel angle. In this case, the position correcting unit 16 performs measured-position correction for moving the current measured position P1 to a small radius portion d2, which corresponds to the movable minimum distance, along the line extending from the measured position P0 through the measured position P1. Rather than correcting the measured position P1 to the position d2 so as to lie at the small-radius portion (on the outer edge of the estimated error range) corresponding to the movable minimum distance, the position correcting unit 16 may correct the measured position P1 to a position d2' so as to lie inside the outer edge.

Figure 6C:
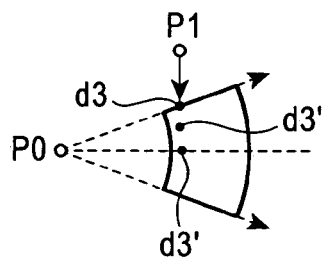

FIG. 6C shows a case in which the distance from the previous measured position P0 to the current measured position P1 lies between the movable maximum distance and the movable minimum distance of the estimated error range, the current travel angle matches the orientation in which the estimated error range is arranged, and the current travel angle is larger than the maximum travel angle. In this case, the position correcting unit 16 performs measured-position correction for moving the current measured position P1 to a position d3 to cross the maximum travel angle toward the center line of the maximum travel angle and the minimum travel angle. The position correcting unit 16 may correct the current measured position P1 to a position d3' so as to lie inside the maximum travel angle (the outer edge of the estimated error range). Similar correction is also performed in a case in which the current measured position P1 lies at a position smaller than the minimum travel angle.

Figure 6D:
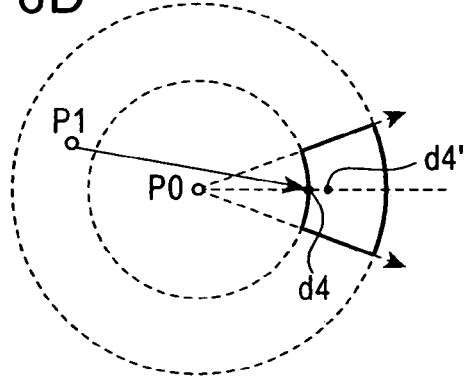

FIG. 6D shows a case in which the distance from the previous measured position P0 to the current measured position P1 lies between the movable maximum distance and the movable minimum distance of the estimated error range and the current travel direction is oriented in a direction opposite to the direction in which the estimated error range is arranged. In this case, the position correcting unit 16 performs measured-position correction for moving the current measured position P1 to a center portion d4 of the small radius corresponding to the movable minimum distance. Rather than correcting the current measured position P1 to the position d4 so as to lie at the center portion (on the outer edge of the estimated error range) of the small radius corresponding to the movable minimum distance, the position correcting unit 16 may correct the measured position P1 to a position d4' so as to lie inside the outer edge.

Figure 6E:
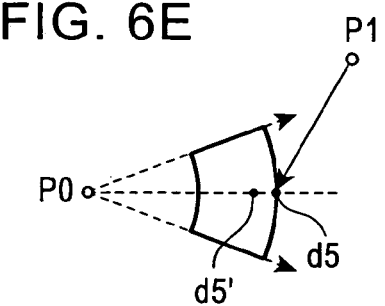

FIG. 6E shows a case in which the distance from the previous measured position P0 to the current measured position P1 is greater than the movable maximum distance of the estimated error range and the current travel direction matches the direction of arrangement of the estimated error range and is out of the range of the minimum travel angle and the maximum travel angle. In this case, the position correcting unit 16 performs measured-position correction for moving the current measured position P1 to a center portion d5 of the large radius corresponding to the movable maximum distance. Rather than correcting the current measured position P1 to the portion d5 so as to lie at the center portion (on the outer edge of the estimated error range) of the large radius corresponding to the movable maximum distance, the position correcting unit 16 may correct the measured position P1 to a position d5' so as to lie inside the outer edge.

Figure 6F:
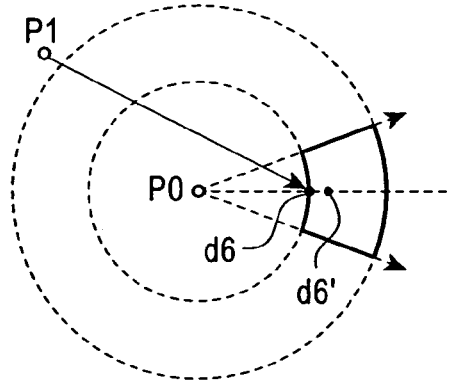

FIG. 6F shows a case in which the distance from the previous measured position P0 to the current measured position P1 is greater than the movable maximum distance of the estimated error range and the current travel angle is oriented in a direction opposite to the arrangement of the estimated error range. In this case, the position correcting unit 16 performs measured-position correction for moving the current measured position P1 to a center portion d6 of the small radius corresponding to the movable minimum distance. Rather than correcting the current measured position P1 to the portion d6 so as to lie at the center portion (on the outer edge of the estimated error range) of the small radius corresponding to the moveable minimum distance, the position correcting unit 16 may correct the measured position P1 to a position d6' so as to lie inside the outer edge.

Figure 6G:
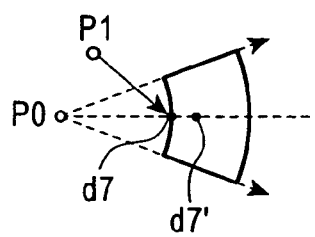

FIG. 6G shows a case in which the distance from the previous measured position P0 to the current measured position P1 is smaller than the movable minimum distance of the estimated error range and the current travel angle is out of the range of the minimum travel angle and the maximum travel angle and is oriented in the same direction as the direction of arrangement of the estimated error range. In this case, the position correcting unit 16 performs measured-position correction for moving the current measured position P1 to a center portion d7 of the small radius corresponding to the movable minimum distance. Rather than correcting the current measured position P1 to the portion d7 so as to lie at the center portion (on the outer edge of the estimated error range) of the small radius corresponding to the movable minimum distance, the position correcting unit 16 may correct the measured position P1 to a position d7' so as to lie inside the outer edge.

Figure 6H:
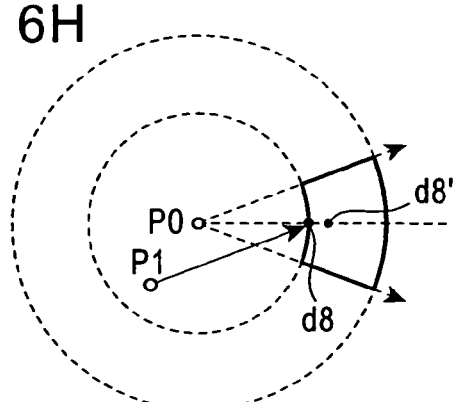

FIG. 6H shows a case in which the distance from the previous measured position P0 to the current measured position P1 is smaller than the movable minimum distance of the estimated error range and the current travel angle is out of the range of the minimum travel angle and the maximum travel angle and is oriented in a direction opposite to the direction of arrangement of the estimated error range. In this case, the position correcting unit 16 performs measured-position correction for moving the current measured position P1 to a center portion d8 of the small radius corresponding to the movable minimum distance. Rather than correcting the current measured position P1 to the portion d8 so as to lie at the center portion (on the outer edge of the estimated error range) of the small radius corresponding to the movable minimum distance, the position correcting unit 16 may correct the measured position P1 to a position d8' so as to lie inside the outer edge.

As described above, even when the actual measured position is out of the estimated error range, the navigation system of the present embodiment performs measured-position correction considering the positional relationship relative to the estimated error range. This, therefore, can improve the correction accuracy of the measured position. Also, the measured position is corrected so that a corrected measured position lies on the outer edge of the estimated error range or lies inside the estimated error range while the positional relationship relative to the estimated error range is considered. Thus, compared to a case in which the measured position is unconditionally corrected to the center position of the estimated error range, the correction accuracy of positioning error can be increased. In particular, correcting the measured position to a position shifted toward the actual measured position makes it possible to ensure that the actual measured position is reflected in a corrected measured position, thereby preventing an increase in error.

The measured position, the velocity of movement of the measured position, and the travel angle thereof are supplied from the GPS receiver 2, and the estimated error range is set based on the velocity and the travel angle. In general, since the accuracies of the velocity and the travel angle supplied from the GPS receiver 2 are higher than the accuracy of the measured position, setting the estimated error range using the velocity and the travel angle makes it possible to accurately set an estimated error range that is likely to include the current measured position.

For the estimated range, a circumferential width centering at the previous measured position is set with respect to the previous travel angle received from the GPS receiver 2, considering a travel-angle variable range set based on the previous velocity. In general, when the velocity is high, a variation in the travel angle at the current positioning time is small, and when the velocity is low, a variation in the velocity is large. Thus, by considering a travel-angle variable range set based on the velocity, it is possible to accurately set the circumferential width of the estimated error range.

For the estimated range, a radial width centering at the previous measured position is set with respect to the previous velocity received from the GPS receiver 2, considering a velocity variable range set based on the previous velocity. In general, when the velocity is high, a variation in the velocity at the current positioning time is small, and when the velocity is low, a variation in the velocity is large. Thus, by considering a velocity variable range set based on the velocity, it is possible to accurately set the radial width of the estimated error range.

The travel-angle variable range is set based on a result obtained by determining, using an actual vehicle, the relationship between a travel-angle fluctuation range and velocities supplied from the GPS receiver 2. The velocity variable range is set based on a result obtained by determining, using an actual vehicle, the relationship between a velocity fluctuation range and velocities supplied from the GPS receiver 2. As a result, since the accurate travel-angle or velocity variable range can be used, the accuracy of the estimated error range can be increased and the correction accuracy of the measured position can further be increased.

The present invention is not limited to the embodiment described above, and various modifications are possible thereto without departing from the spirit and scope of the present invention. In the embodiment described above, while the estimated error range is calculated using Equations (1) to (4), the size of the estimated error range may be set to be variable in accordance with a positioning environment. For example, (Estimated Acceleration Minimum), (Estimated Acceleration Maximum) (Estimated Angular-velocity Minimum), and (Estimated Angular-velocity Maximum) in Equation (1) and so on may be multiplied by a parameter a representing the positioning environment to adjust those values. This can allow the estimated error range to be set so as to correspond to the positioning environment, thus making it possible to perform adequate measured-position correction corresponding to the positioning environment. In particular, when the positioning environment is favorable, the value of the above-mentioned parameter a may be set to be large to thereby set the estimated error range to be large. In such a case, when the positioning environment is favorable and the accuracy of the position measured by the GPS is high, the number of opportunities using the GPS-measured position without correction is increased to allow a reduction in cumulative error.

Second Embodiment

The navigation system of the first embodiment described above sets the orientation (i.e., the center directions shown in FIGS. 2 and 3) of the estimated error-range corresponding to the current positioning time, in accordance with the vehicle travel direction at the previous positioning time. However, when the vehicle travel direction changes greatly as in the case of a winding road and the vehicle exhibits circular motion, the vehicle travel angle at the previous positioning time and the vehicle travel angle at the current positioning time differ from each other. In such a case, therefore, it is desirable to correct the orientation of the estimated error range by considering the amount of change in the travel angle.

Figure 7:
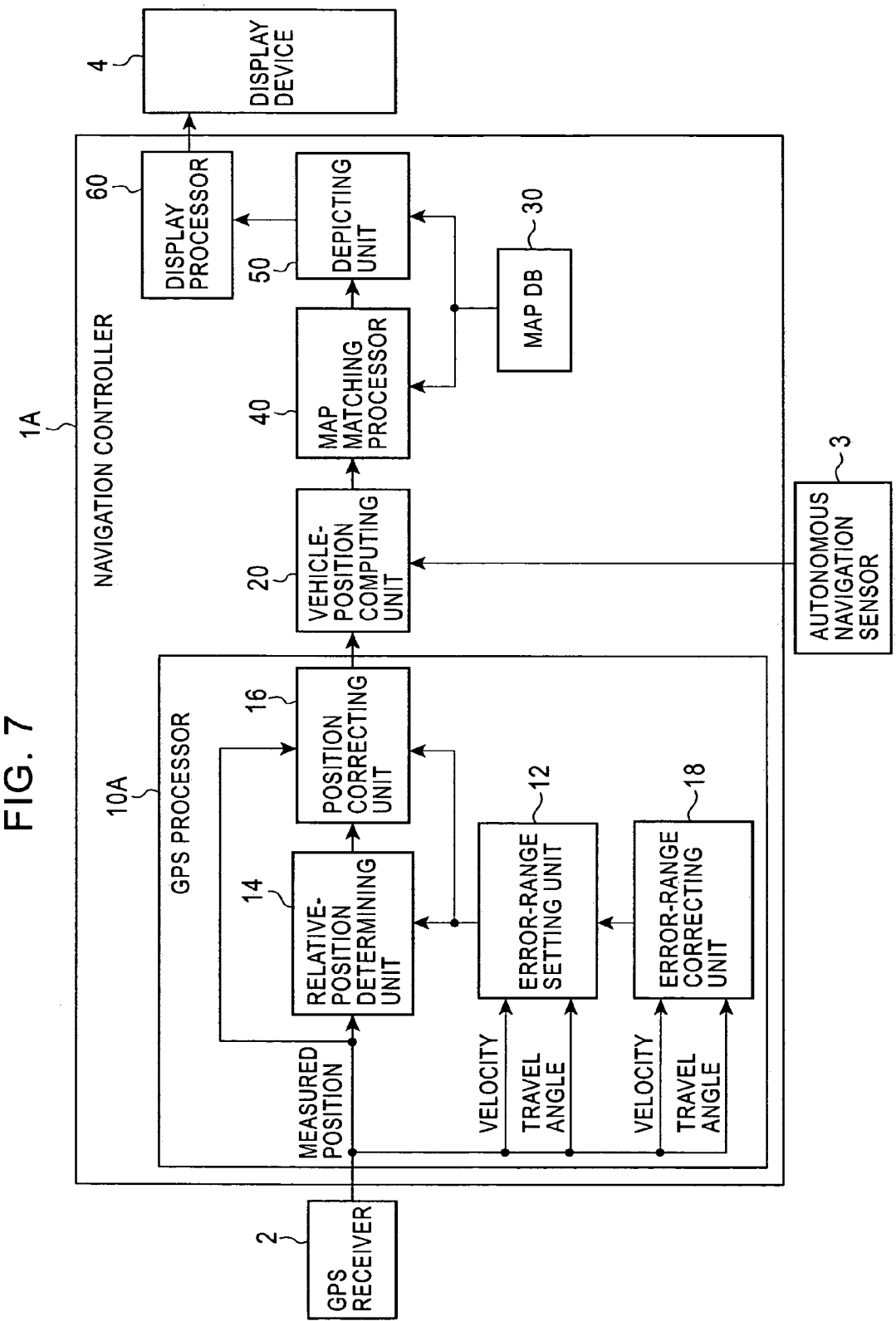
FIG. 7 is a diagram showing the configuration of a navigation system according to a second embodiment.

FIG. 7 is a diagram showing the configuration of a navigation system according to a second embodiment. The navigation system of the second embodiment shown in FIG. 7 is different from the navigation system of the first embodiment shown in FIG. 1 in that an error-range correcting unit 18, which serves as an estimated-error-range correcting section, is added to a GPS processor 10A in a navigation controller 1A. In accordance with the value of the travel angle at multiple positioning times before the previous positioning time, the error-range correcting unit 18 corrects the orientation (the center direction) of the estimated error range set for the current positioning time.

Figure 8:
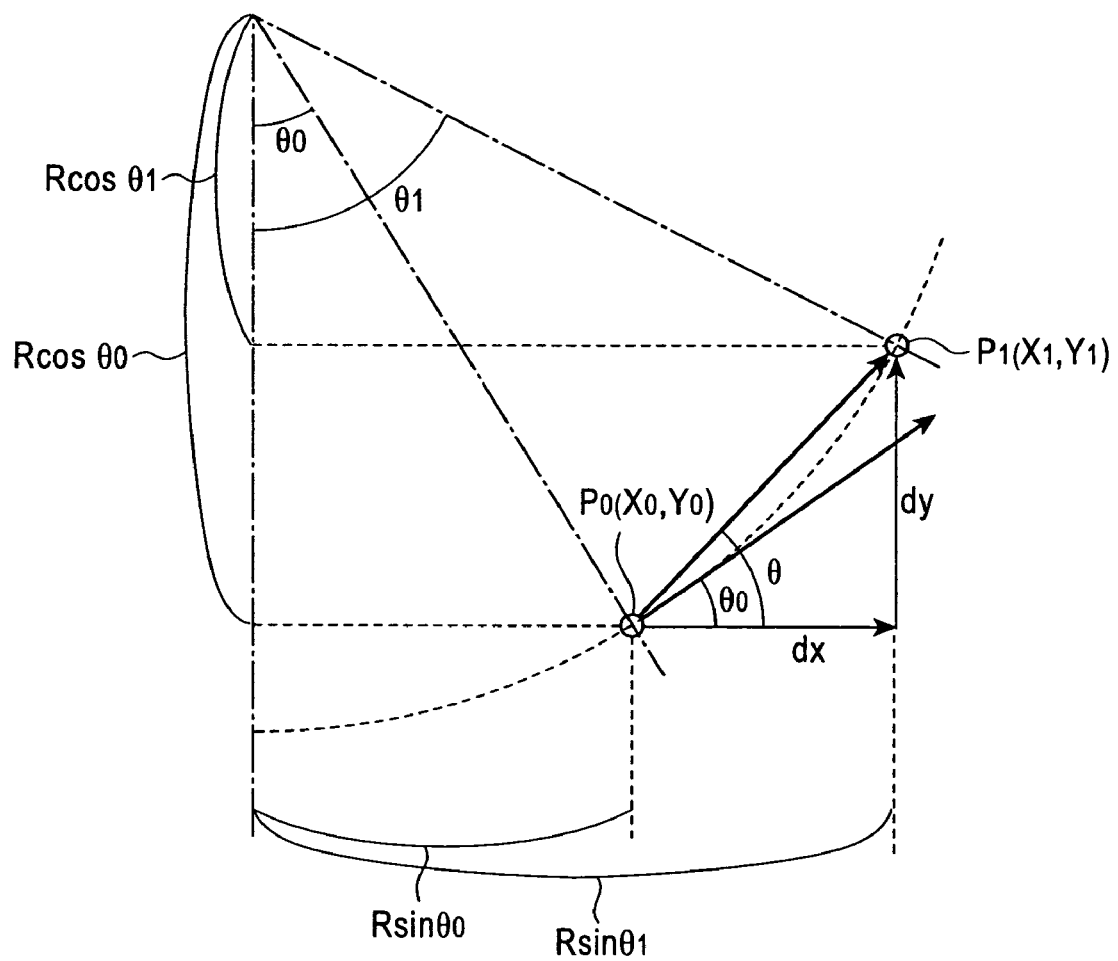
FIG. 8 is a schematic diagram illustrating the amount of correction when the travel angle at the previous positioning time and the travel angle at the positioning time before the previous poisoning time are used to correct the orientation of the estimated error range.

FIG. 8 is a schematic diagram illustrating the amount of correction when the travel angles at the previous positioning time and the positioning time before the previous positioning time are used to correct the orientation of the estimated error range. In FIG. 8, $P_0(X_0, Y_0)$ indicates a measured position corresponding to the previous positioning time, $\theta_0$ indicates the travel angle, $P_1(X_1, Y_1)$ indicates a measured position corresponding to the current positioning time, and $\theta_1$ indicates the travel angle. A correct travel angle $\theta$ when the vehicle travels from the measured position $P_0$ to $P_1$ can be calculated from the following equation. R indicates a radius when the vehicle exhibits circular motion with a constant radius.

$$\theta = \tan^{-1}((\cos\theta_0 - \cos\theta_1)/(\sin\theta_1 - \sin\theta_0)) \quad (5)$$

In practice, however, the travel angle $\theta$ at the current positioning time is unknown. Thus, the difference $(\theta_0 - \theta_{-1})$ between the travel angle $\theta_0$ at the previous positioning time and a travel angle $\theta_{-1}$ at the positioning time before the previous one is used as the angular velocity to estimate the travel angle $\theta_1$ at the current positioning time, as follows.

$$\theta_1 = \theta_0 + (\theta_0 - \theta_{-1})$$

Therefore, using $\theta_1$, Equation (5) can be transformed into the following:

$$\theta = \tan^{-1}((\cos\theta_0 - \cos(\theta_0 + (\theta_0 - \theta_{-1})))/(\sin(\theta_0 + (\theta_0 - \theta_{-1})) - \sin\theta_0)) \quad (6)$$

In this manner, the correct travel angle $\theta$ when the vehicle travels from the previous measured position to the current measured position can be estimated in accordance with the previous travel angle and the travel angle before the previous one. The error-range correcting unit 18 performs correction for shifting the center direction of the estimated error range, shown in FIGS. 2, 3, and 6, by the amount of the difference $(\theta - \theta_0)$ between the estimated travel angle $\theta$ and the previous travel angle $\theta_0$, i.e., performs correction for matching the center direction of the estimated error range with the estimated travel angle $\theta$.

As described above, when the vehicle travels at a place where the vehicle travel direction changes greatly as in the case of a winding road, the navigation system of the second embodiment can adjust the orientation of the estimated error range by considering a change in the travel direction to correct the measured position. Thus, it is possible to further improve the correction accuracy of the measured position. In particular, since the estimated error range is corrected in accordance with the value of the previous travel angle and the value of the travel angle before the previous one, the correction can be performed with less computation and the processing load can be reduced.

Also, estimating the vehicle travel direction when the measured position is to be corrected and adjusting the arrangement of the estimated error range according to the estimated travel direction makes it possible to perform measured-position correction that is more suitable for an actual situation. In addition, when a change in the travel angle is large, the amount of adjustment of the arrangement of the estimated error range can be set large, and when a change in the travel angle is small, the amount of adjustment of the arrangement of the estimated error range can be set small. Thus, it is possible to perform measured-position correction according to a road shape.

The arrangement may also be such that, when the amount of travel-angle change $(\theta_0 - \theta_{-1})$, which is a difference in movement of measured positions, is larger than a reference value, the error-range correcting unit 18 corrects the orientation of the estimated error range, and when the amount of change is smaller than the reference value, the error-range correcting unit 18 does not correct the orientation of the estimated error range. This arrangement can reduce the processing load when the change in the travel angle is small.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A navigation system comprising:
   a global-positioning-system receiver for receiving radio waves transmitted from multiple global-positioning-system satellites and producing a measured position;
   an error-range setting section for setting an estimated error range in which a measured position at the time of current positioning by the global-positioning-system receiver is included; and
   a position correcting section for correcting the measured position by using an actual measured position, when the actual measured position produced by the global-positioning-system receiver at the current positioning time is in the estimated error range, and for correcting the measured position in accordance with a relative positional relationship between the actual measured position and the estimated error range, when the actual measured position is out of the estimated error range.

2. The navigation system according to claim 1, wherein the position correcting section corrects the measured position so that the corrected measured position is in the estimated error range.

3. The navigation system according to claim 1, wherein the position correcting section corrects the measured position so that the corrected measured position is located in the estimated error range and is shifted toward the actual measured position.

4. The navigation system according to claim 1, wherein the position correcting section corrects the measured position so that the corrected measured position is located on an outer edge of the estimated error range.

5. The navigation system according to claim 1, wherein the position correcting section corrects the measured position so that the corrected measured position is located on an outer edge of the estimated error range and is shifted toward the actual measured position.

6. The navigation system according to claim 1, wherein the global-positioning-system receiver produces, together with the measured position, a velocity and a travel angle at which the measured position moves, and the error-range-setting section sets the estimated error range in accordance with the velocity and the travel angle.

7. The navigation system according to claim 6, wherein, for the estimated error range, a circumferential width centering at a previous measured position is set with respect to a previous travel angle supplied from the global-positioning-system receiver, considering a travel-angle variable range set based on a previous velocity.

8. The navigation system according to claim 6, wherein, for the estimated error range, a radial width centering at a previous measured position is set with respect to a previous velocity supplied from the global-positioning-system receiver, considering a velocity variable range set based on a previous velocity.

9. The navigation system according to claim 7, wherein the travel-angle variable range is set based on a result obtained by determining, using an actual vehicle, a relationship between velocities produced by the global-positioning-system receiver and a travel-angle fluctuation range.

10. The navigation system according to claim 8, wherein the velocity variable range is set based on a result obtained by determining, using an actual vehicle, a relationship between velocities produced by the global-positioning-system receiver and a velocity fluctuation range.

11. The navigation system according to claim 9, wherein the size of the estimated error range is set to be variable in accordance with a positioning environment.

12. The navigation system according to claim 11, wherein the estimated error range is set to be large, when the positioning environment is favorable.

13. A navigation system comprising:
a global-positioning-system receiver for receiving radio waves transmitted from multiple global-positioning-system satellites and producing a measured position and travel angle at which the measured position moves;
an error-range setting section for setting an estimated error range in which a measured position at the time of current positioning by the global-positioning-system receiver is included and wherein the estimated error range is set using the travel angle; and
a position correcting section for correcting the measured position by using an actual measured position, when the actual measured position produced by the global-positioning-system receiver at the current positioning time is in the estimated error range, and for correcting the measured position in accordance with a relative positional relationship between the actual measured position and the estimated error range, when the actual measured position is out of the estimated error range.

14. The navigation system according to claim 13, wherein the error-range setting section further comprises an estimated-error-range correcting section for correcting the orientation of the estimated error range set by the error-range-setting section, in accordance with the previous value of the travel angle at which the measured position moves and at least one value before the previous value.

15. The navigation system according to claim 14, wherein, in accordance with the previous value of the travel angle at which the measured position moves and the value before the previous value, the estimated-error-range correcting section calculates a direction in which the measured position moves from the previous positioning time to the current positioning time, and corrects the orientation of the estimated error range so that the calculated direction becomes the center of the estimated error range.

16. The navigation system according to claim 14, wherein the estimated-error-range correcting section corrects the orientation of the estimated error range, considering an amount of change in the travel angle.

17. The navigation system according to claim 14, wherein the estimated-error-range correcting section corrects the orientation of the estimated error range, only when a change in the travel angle at which the measured position moves is larger than a reference value.

18. A method of correcting a measured position in a navigation system comprising:
receiving radio waves transmitted from multiple global-positioning-system satellites and producing a measured position;
setting an estimated error range in which a measured position at the time of current positioning is included; and
correcting the measured position by using an actual measured position, when the actual measured position at the current positioning time is in the estimated error range, and for correcting the measured position in accordance with a relative positional relationship between the actual measured position and the estimated error range, when the actual measured position is out of the estimated error range.

19. The method according to claim 18, wherein the measured position is corrected so that the corrected measured position is located in the estimated error range and is shifted toward the actual measured position.

20. The method according to claim 18, wherein, together with the measured position, a travel angle at which the measured position moves is produced, and the estimated error range is set in accordance with the travel angle.

* * * * *